(12) United States Patent
Kanai

(10) Patent No.: US 11,714,896 B2
(45) Date of Patent: Aug. 1, 2023

(54) INFORMATION PROCESSING APPARATUS, INFORMATION PROCESSING METHOD, AND COMPUTER PROGRAM

(71) Applicant: KABUSHIKI KAISHA TOSHIBA, Tokyo (JP)

(72) Inventor: Jun Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/249,323

(22) Filed: Feb. 26, 2021

(65) Prior Publication Data

US 2022/0083645 A1 Mar. 17, 2022

(30) Foreign Application Priority Data

Sep. 11, 2020 (JP) .................. 2020-153265

(51) Int. Cl.
*G06F 21/54* (2013.01)
*G06F 21/53* (2013.01)
*G06F 21/64* (2013.01)

(52) U.S. Cl.
CPC .............. *G06F 21/53* (2013.01); *G06F 21/54* (2013.01); *G06F 21/64* (2013.01); *G06F 2221/2141* (2013.01); *G06F 2221/2149* (2013.01)

(58) Field of Classification Search
CPC .......... G06F 21/53; G06F 21/54; G06F 21/64; G06F 2221/2149; G06F 2221/2141; G06F 21/6218
See application file for complete search history.

(56) References Cited

U.S. PATENT DOCUMENTS

| | | | | |
|---|---|---|---|---|
| 7,181,438 B1* | 2/2007 | Szabo | ................. | G06F 21/6245 705/14.27 |
| 8,302,101 B2* | 10/2012 | Bissett | .................... | G06F 21/53 718/1 |
| 10,360,162 B2* | 7/2019 | McCarthy | ........... | G06F 9/30189 |
| 11,204,717 B2* | 12/2021 | Cheru | .................. | G06F 3/0605 |
| 2002/0099944 A1 | 7/2002 | Bowlin | | |
| 2003/0200454 A1* | 10/2003 | Foster | ................. | G06F 21/6218 726/17 |
| 2005/0223239 A1* | 10/2005 | Dotan | ................... | G06F 21/566 713/188 |
| 2007/0106671 A1* | 5/2007 | Uchida | ............... | G06F 16/2471 |
| 2008/0244738 A1* | 10/2008 | Shiozawa | .......... | G06F 21/6218 726/21 |
| 2013/0304762 A1* | 11/2013 | Shimono | ................ | G06F 16/24 707/781 |

(Continued)

FOREIGN PATENT DOCUMENTS

| | | |
|---|---|---|
| JP | 5423063 B2 | 2/2014 |
| JP | 2020-46829 A | 3/2020 |
| JP | 2022-32285 A | 2/2022 |

*Primary Examiner* — Farid Homayounmehr
*Assistant Examiner* — Mudasiru K Olaegbe
(74) *Attorney, Agent, or Firm* — Finnegan, Henderson, Farabow, Garrett & Dunner, LLP

(57) ABSTRACT

According to one embodiment, an information processing apparatus includes: an access detector configured to detect an access request for target data; and a determiner configured to determine necessity of checking information indicating whether access to the target data is permitted, based on position information on the target data, and on a data range to be checked.

17 Claims, 16 Drawing Sheets

(56) References Cited

U.S. PATENT DOCUMENTS

| | | | |
|---|---|---|---|
| 2014/0082692 A1* | 3/2014 | Gladstone | G06N 5/02 |
| | | | 726/1 |
| 2020/0089914 A1* | 3/2020 | Komatsubara | G06F 21/51 |
| 2021/0248255 A1* | 8/2021 | Matsuoka | G06F 16/11 |
| 2022/0050727 A1 | 2/2022 | Kantake et al. | |
| 2022/0067195 A1* | 3/2022 | Kuppusamy | G06F 9/4411 |

* cited by examiner

| PROCESS ID | ROOT DIRECTORY PATH |
|---|---|
| 1220 | /home/data1/ |

FIG. 4

|  | VALUE |
|---|---|
| CURRENT PROCESS ID | 1234 |
| PARENT PROCESS ID | 1230 |

|  | VALUE |
|---|---|
| CURRENT PROCESS ID | 1230 |
| PARENT PROCESS ID | 1220 |

|  | VALUE |
|---|---|
| CURRENT PROCESS ID | 1220 |
| PARENT PROCESS ID | NULL |

FIG. 5

| DIRECTORY PATH |
|---|
| /home/data1/ |

FIG. 6

|  | VALUE |
|---|---|
| CURRENT PROCESS ID | 1234 |
| PARENT PROCESS ID | 1230 |
| ENVIRONMENT ACTIVATION PROCESS ID | 1220 |

|  | VALUE |
|---|---|
| CURRENT PROCESS ID | 1230 |
| PARENT PROCESS ID | 1220 |
| ENVIRONMENT ACTIVATION PROCESS ID | 1220 |

|  | VALUE |
|---|---|
| CURRENT PROCESS ID | 1220 |
| PARENT PROCESS ID | 200 |
| ENVIRONMENT ACTIVATION PROCESS ID | 1220 |

|  | VALUE |
|---|---|
| CURRENT PROCESS ID | 200 |
| PARENT PROCESS ID | NULL |
| ENVIRONMENT ACTIVATION PROCESS ID | NULL |

FIG. 10

| PROCESS ID | ROOT DIRECTORY PATH |
|---|---|
| 1220 | /home/data1/ |
| 2230 | /home/data1/foo/ |

INFORMATION PROCESSING APPARATUS, INFORMATION PROCESSING METHOD, AND COMPUTER PROGRAM

CROSS REFERENCE TO RELATED APPLICATIONS

This application is based upon and claims the benefit of priority from the prior Japanese Patent Application No. 2020-153265, filed on Sep. 11, 2020, the entire contents of which are incorporated herein by reference.

FIELD

Embodiments described herein relate to an information processing apparatus, an information processing method, and a computer program.

BACKGROUND

In recent years, cyberattacks against control systems have been generally widespread. Accordingly, security measures should be urgently taken. In many cases, the control systems have devices that are not connected to external networks. In view of availability, software updates are avoided as much as possible. Accordingly, also to take security measures, whitelist type execution control technology that negates the need to update pattern files has been widely used. In a case where reliable programs and unreliable programs are mixedly included in a computer, sandbox technology for isolating and then executing the unreliable programs has been widely used.

As an example of using the sandbox technology, a technology has been known that refers to an access control policy preset when a program is activated, and determines whether the program is operated in a sandbox or is operated out of the sandbox.

This technology allows the unreliable programs to be executed in the sandbox. Unfortunately, it is determined whether to perform a process of referring to the access control policy or not, based on whether an execution target program is operated in the sandbox or operated out of the sandbox. Accordingly, flexible access control cannot be achieved.

BRIEF DESCRIPTION OF THE DRAWINGS

FIG. 4 shows an example of an environment activation process table according to the first embodiment;

FIG. 5 shows an example of a process table according to the first embodiment;

FIG. 6 shows an example of a check target directory table according to the first embodiment;

FIG. 10 shows an example of a process table according to a variation example of the first embodiment;

DETAILED DESCRIPTION

Figure 1:
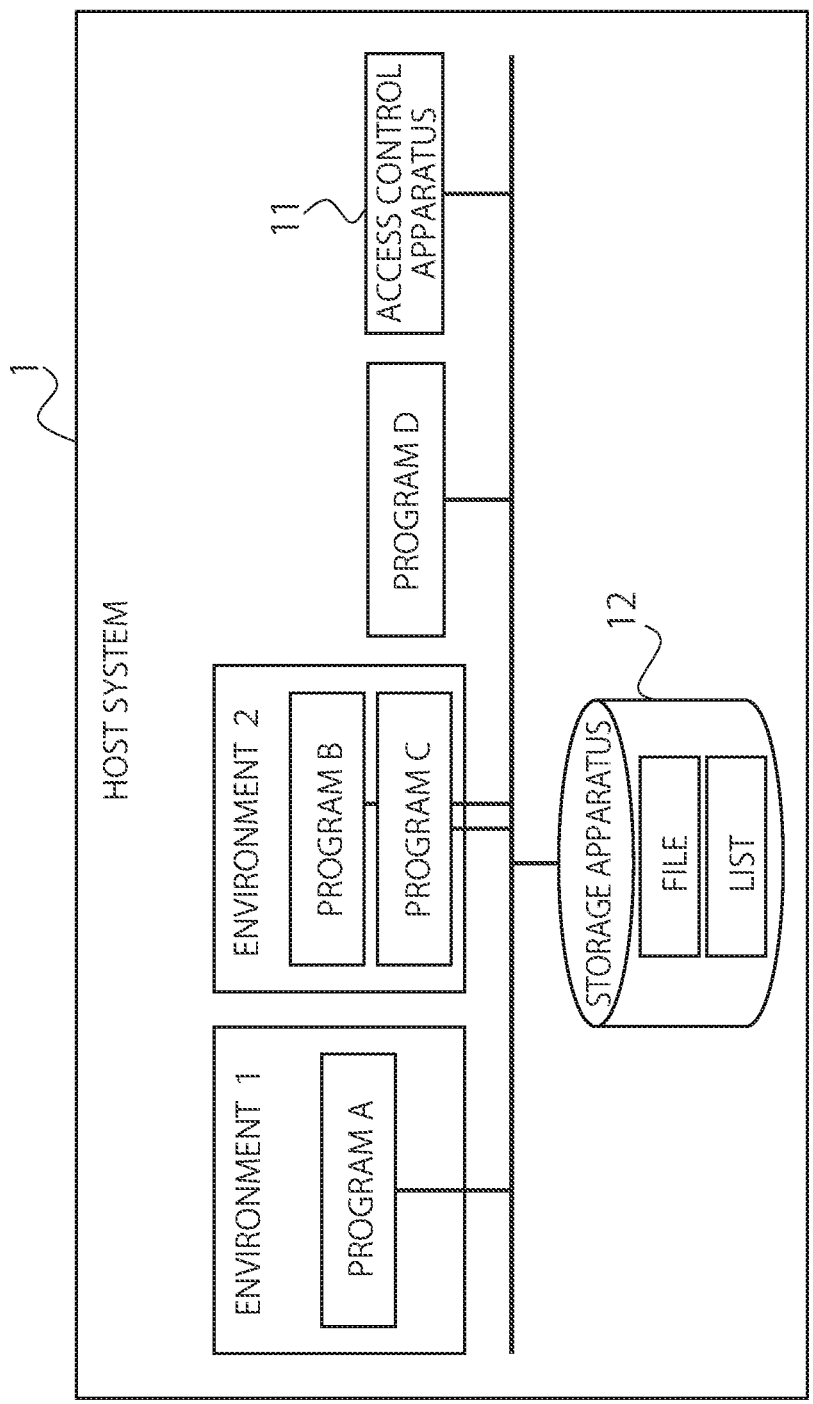
FIG. 1 shows an example of a host system according to a first embodiment.

According to one embodiment, an information processing apparatus includes: an access detector configured to detect an access request for target data; and a determiner configured to determine necessity of checking information indicating whether access to the target data is permitted, based on position information on the target data, and on a data range to be checked.

Hereinafter, referring to the drawings, embodiments of the present invention are described. In the following description, the same or similar elements are assigned the same symbols, and redundant description is basically omitted. For example, among multiple drawings, corresponding elements are assigned the same symbols, and detailed description may be omitted.

First Embodiment

FIG. 1 shows an example of an internal configuration of a host system 1 according to this embodiment. In the host system 1 there are provided multiple environments (an environment 1 and an environment 2), a program D (process D) to be executed on an operating system (OS) by a central processing unit (CPU), an access control apparatus 11, and a storage apparatus 12 (storage). An execution unit of the program is called a process. Hereinafter, the program D is also called the process D.

The access control apparatus 11 is an information processing apparatus according to this embodiment, and operates directly on the host system 1. The access control apparatus 11 can be achieved by causing a processor, such as a CPU, to execute the program, for example.

The storage apparatus 12 stores a file that is an example of data according to this embodiment, a list used by the access control apparatus 11 for check, information or data generated by the OS, and information, data, tables and the like generated by the access control apparatus 11. The storage apparatus 12 includes any of recording media, such as a volatile or nonvolatile memory, a hard disk, an SSD, an optical device, and a magnetic storage device.

The list used for check includes information about data (files) to which access is permitted or denied. Examples of the information on the list used for check include identifiers of files, and file paths. Details of information included in the list are described later. A list that includes the information about files to which access is permitted is called a whitelist. A list that includes the information about files to which access is denied is called a blacklist. The list may be provided for each environment, provided to multiple environments in common, or provided in conformity with other standards.

The environments 1 and 2 are, for example, virtual environments constructed on the OS. The environment 1 or the environment 2 may be a sandbox. There are possible cases where the environments 1 and 2 are constructed on the same OS, and alternatively constructed on different OSs. In the environment 1, a program A is executed. Hereinafter, the program A executed in the environment 1 is also called a process A. In the environment 2, programs B and C are executed. Hereinafter, the programs B and C executed in the environment 2 are also called processes B and C, respectively. The processes B and C may have a parent and child relationship. The program A (process A) operating in the environment 1 can access data (files etc.) belonging to a data range defined by setting (root directory etc.) at the time of activation of the environment 1. Similar to the program A, the program B (process B) and the program C (process C) in the environment 2 can also access data (files etc.) belonging to a data range defined by setting at the time of activation of the environment 2. That is, among the files stored in the storage apparatus 12, files belonging to this data range are accessible. However, access may be sometimes denied; for example, files to be checked by the access control apparatus 11 are accessible only if permission is allowed by check.

The program D is operating directly on the host system 1, and can basically access all the files in the storage apparatus 12. However, access is sometimes denied; for example, files to be checked by the access control apparatus 11 are accessible only if permission is allowed by check, similar to those in the environments 1 and 2.

When a request for access to a file is issued by a process (process A, B, C, D or the like), the access control apparatus 11 performs check against the list on the basis of information about the file to be accessed. Access to a file encompasses various modes that are file reading (reading file data itself, reading a property value of the file and the like), and file execution. In the following description, file access includes file execution.

Functions achieved by the programs A to D in FIG. 1 can be implemented as apparatuses.

Figure 2:
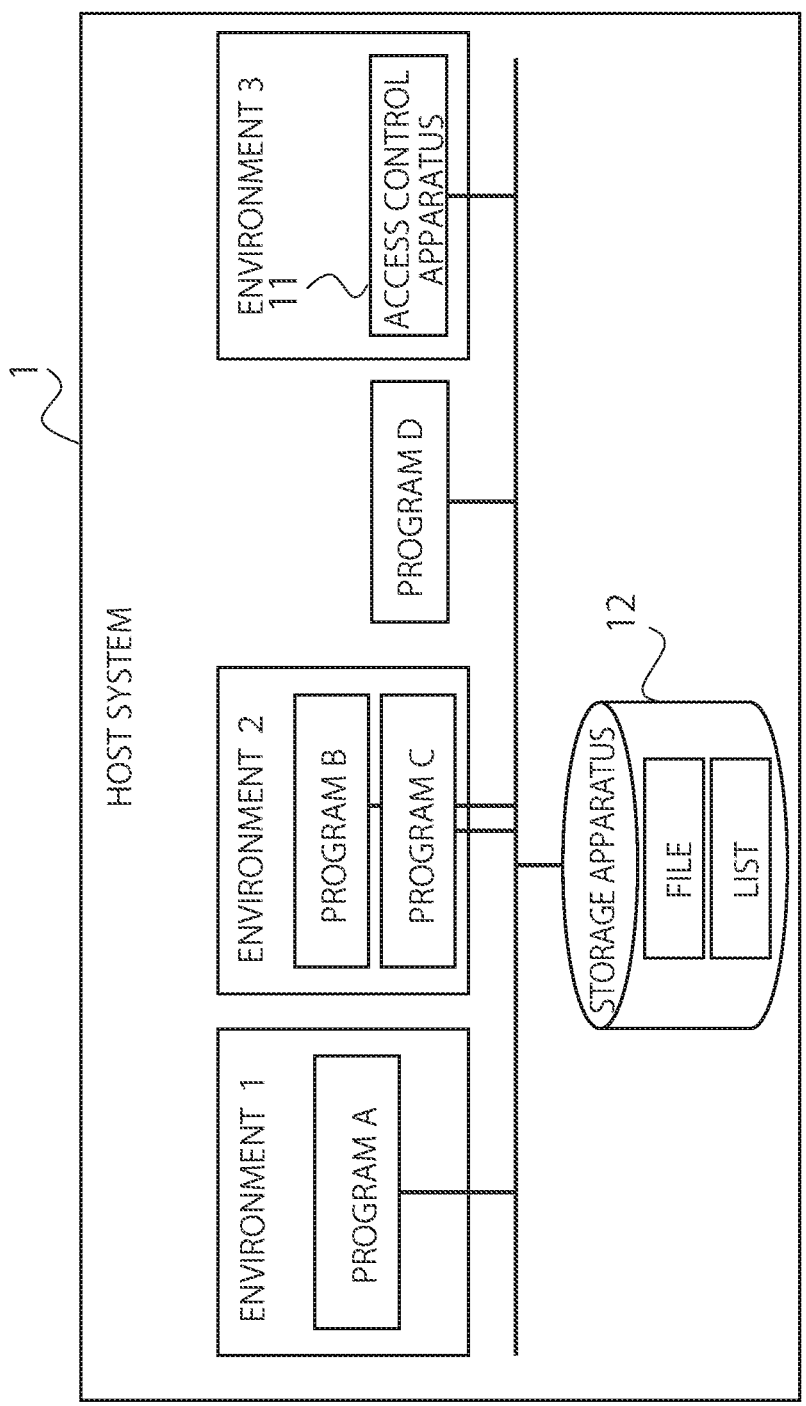
FIG. 2 shows an example of the host system according to the first embodiment.

FIG. 2 shows another example of the internal configuration of the host system 1 according to this embodiment. The programs A to D in FIG. 1 are replaced with apparatuses A to D. The access control apparatus 11 is provided in an environment 3. The apparatus A is executed in the environment 1. The apparatuses B and C are executed in the environment 2. The apparatus D is operated directly on the host system 1. The access control apparatus 11 is operated in the environment 3. The apparatuses A and D and the access control apparatus 11 may be connected to each other via a wired or wireless communication network, or connected via a communication bus.

Figure 3:
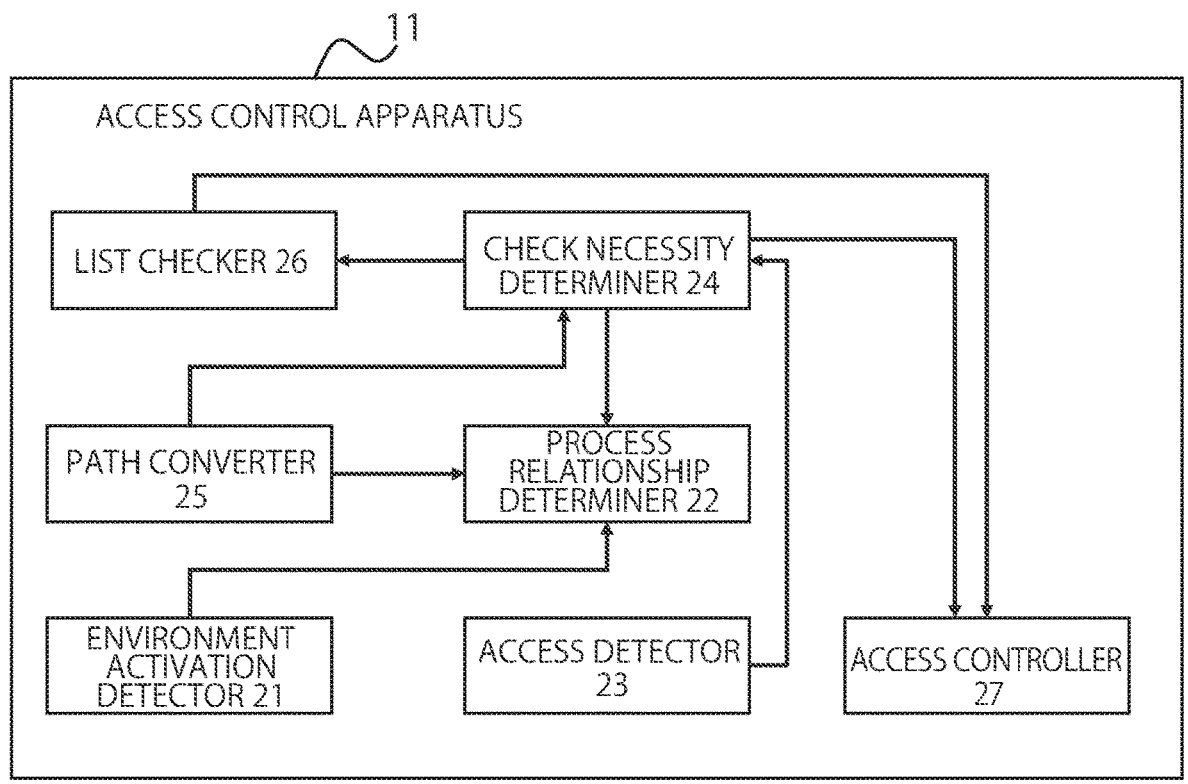
FIG. 3 shows an example of an access control apparatus according to the first embodiment.

FIG. 3 is a block diagram showing an example of the access control apparatus 11 according to this embodiment. The access control apparatus 11 includes an environment activation detector 21, a process relationship determiner 22, an access detector 23, a check necessity determiner 24 (determiner), a path converter 25, a list checker 26, and an access controller 27.

The environment activation detector 21 has a function of detecting activation and generation of an environment separated from the host system 1. The environment separated from the host system 1 (hereinafter simply called the environment) may be an environment achieved by a scheme of adopting a specific directory path called "chroot" as a root directory of a process in the case of Linux. Alternatively, the environment may be achieved by a scheme of separating a name space by "namespace". In any of these cases, the environment activation detector 21 detects activation of an environment by capturing a specific system call, for example, "chroot" system call.

The environment activation function is provided with a function of changing the root directory in the environment. For example, this function adopts, as a new root directory, a specific directory on a layer at or below the original root directory. For example, in a case where the original root directory is "/", this function adopts "/home/" as a new root directory. The process that is activated in a new environment and is operated cannot access files or directories residing above the new directory. Consequently, change of the root directory can limit accessible files. For example, designation of "/home/" as the new directory allows "/home/foo" to be accessible from processes operated in the new environment, while making "/bar" inaccessible. As described above, the root directory defines the data range referable by the environment.

Upon detection of activation of the environment, the environment activation detector 21 records the path of the root directory, and the identifier (process ID) of a process (fourth process) having activated the environment, in an environment activation process table (environment data).

FIG. 4 shows an example of the environment activation process table. In the example in FIG. 4, a case is shown where the process (fourth process) with a process ID of "1200" newly activates an environment with a root directory path of "/home/data1/".

The process relationship determiner 22 has a function of acquiring the ID of a process (environment activation process) having activated an environment for a process having a process ID provided from the check necessity determiner 24 in response to a request by the check necessity determiner 24. The process relationship determiner 22 has a function of acquiring the root directory of this environment activation process. For example, a process (process A) having a process ID of "A" (described as "PROCESS ID"="A"; hereinafter the same applies) activates an environment, and the process A activates a child process (process B) having "PROCESS ID"="B". Furthermore, the process B activates a child process (process C) having "PROCESS ID"="C". In this case, the process having activated the environment for the process C is the process A, and the process ID of the process (environment activation process) having activated the environment for the process C is "A".

As a method of acquiring the process ID of the environment activation process and the root directory, a process table that the operating system (OS) generates can be used. An example using the process table is shown.

FIG. 5 shows an example of the process table. The process table stores, as an entry, a pair of the process ID (current process ID) of a process and the process ID (parent process ID) of a process (parent process) having activated this process. For example, to trace the ancestor of a process having "PARENT PROCESS ID"="1234", an entry having "PROCESS ID"="1234" is referred to, which shows that the ID of the parent process is "1230". The process table is further traced, and an entry having "PROCESS ID"="1230" is referred to, which shows the ID of the parent process is "1220". The process table is further traced, and an entry having "PROCESS ID"="1220" is referred to, which shows information indicating that there is no parent process. Every time the parent process is traced in this manner, the environment activation process table in FIG. 4 is referred to, and it is checked whether the process ID of the parent process is recorded in the environment activation process table.

In the examples in FIGS. 4 and 5, "PROCESS ID"="1234" and "PROCESS ID"="1230" are not registered in the environment activation process table. However, "PROCESS ID"="1220" is registered in the environment activation process table. Accordingly, it is shown that the process (environment activation process) having activated the environment is a process with "PROCESS ID"="1220". It is further shown that the directory path of the root directory of the environment activation process is "/home/data1/".

The access detector 23 has a function of detecting a request for access to data (file) by a process. The access detector 23 detects file access by capturing a specific system call. When a request for file access is detected, a file is not accessed yet. Upon detection of a request for file access, the access detector 23 notifies the ID of the process having requested the file access, and the path (position information) of the file that is the access request destination, to the check necessity determiner 24. This path is not a path representing the position of the file from the viewpoint of the inside of the environment to which the process having requested file access belongs, but is a path representing the position of the file from the viewpoint of the host system 1.

When the access detector 23 detects a request for file access issued by the process, the check necessity determiner 24 (determiner) determines necessity of check of whether the file (target data) requested to be accessed is a file permitted or denied to be accessed. To determine the necessity of check, various pieces of information can be used. For example, these pieces include position information (e.g., a file path etc.) on a file that is an access request destination requested by the process, a range (first data range) of a file referable from the environment in which the process having requested access is operated, a range of files (second data range) referable from a process (sometimes called a security process) having a security function, and information on the environment in which each process is operated. Hereinafter, specific examples (1) to (5) of determination of necessity of check are described.

(1) For example, based on whether or not the security process (third process), and the process (second process) having requested file access are operated on the same environment (according to whether the ancestors of both the processes are the same or not), the necessity of check is determined. For example, if both the processes are operated in the same environment, the check necessity determiner 24 determines to perform the check. Conversely, if both the processes are not operated in the same environment, it is determined not to perform check. Specifically, the check necessity determiner 24 acquires, from the process relationship determiner 22, the process ID of the process having activated the environment for the security process, and the process ID of the process having activated the environment for the process having requested access. If both the acquired process IDs are the same, it is determined that both the processes are operated in the same environment. If both the processes are operated in the same environment, it can be determined that the data range referable from the security process (the data range serving as a check target, or the second data range) includes the position information on the file.

(2) According to whether the security process (third process) is accessible to the file requested to be access by the process (second process) or not, the necessity of check is determined. For example, the necessity of check is determined based on whether the data range referable from the security process (the data range serving as a check target, or the second data range) includes the position information on the file. If the security process can access the file, it is determined to perform check. If not accessible, it is determined not to perform check. Specifically, the check necessity determiner 24 acquires, from the process relationship determiner 22, the root directory path (i.e., the root directory path of the environment in which the security process is operated) of the process having activated the environment in which the security process is operated. The check necessity determiner 24 performs a forward-matching test between the acquired directory path and the path of the file requested to be accessed by the process. For example, if the directory path of the environment activation process is "/home/" and the path of the file requested to be accessed is "/home/foo/bar", the forward-matching test result is true. In this case, the security process can access this file. On the other hand, if the path of the file requested to be accessed is "/hoge/", the forward-matching test result is false. In this case, the security process cannot access this file.

(3) The necessity of check is determined by comparing the root directory path of the environment in which the security process (third process) is operated, with the root directory path of the environment in which the process (second process) having requested access is operated. In other words, the necessity of check is determined according to whether this process and the security process have a descendant relationship. For example, it is assumed that the root directory path of the environment in which the security process is operated is "/home/" and the directory path of the environment in which the process having requested access is operated is "/home/foo/". In this case, a forward-matching test is performed between both the root directory paths, and the forward-matching test result is true (in this case, the process corresponds to a descendant of the security process). That is, the position information on the file is included in the data range referable from the security process (the data range serving as a check target, or the second data range). Accordingly, the security process can access the file requested to be accessed by this process. Consequently, in this case, the check necessity determiner 24 determines to perform check. Conversely, if the forward-matching test result is false, it is determined not to perform check.

(4) A list of directory paths to be checked is preliminarily configured. The check necessity determiner 24 determines the necessity of check based on the relationship between the file requested to be accessed and the directory path registered in the list (the relationship between the position information on the file and the data range to be checked). That is, it is determined whether or not the file requested to be accessed is on a layer at or below the directory indicated by the directory path registered in the list. If the file is on a layer at or below this directory, it is determined to perform check. If not, it is determined not to perform check.

(5) It may be determined to perform check, if the process having requested access (second process) and the process having activated the environment for this process (first process) have a descendant relationship. If there is a descendant relationship, the position information on the file requested to be accessed is included in the data range referable from the environment of this process (the data range to be checked, or the first data range).

FIG. 6 shows an example of a check target directory table that lists directory paths to be checked. If the file requested to be accessed is on a layer at or below "/home/data1/", it is determined to perform check. If not, it is determined not to perform check.

Multiple methods among the determination methods (1) to (5) may be combined to determine the necessity of check.

The path converter 25 converts the path of the file to be checked, into a path referable from the security process. For example, it is assumed that the root directory of the environment in which the security process is operated is "/home/", and the path of the file requested to be accessed is "/home/foo/bar". In this case, "/home/foo/bar" is converted into "/foo/bar". Specifically, first, the root directory of the environment in which the security process is operated is acquired. Next, a character string of a forward-matching part between the acquired path of the root directory and the file path requested to be accessed is removed from the file path requested to be accessed. For example, a forward part "/home/" is removed from "/home/foo/bar" to acquire "foo/bar", to which "/" is prepended to produce "/foo/bar".

If the check necessity determiner 24 determines to perform check, the list checker 26 checks information about the file requested to be accessed (target data), against the list storing information about files permitted to be accessed or denied to be accessed. The information about the file requested to be accessed can be acquired from the security process. For example, the security process acquires the information about the file from the file on the basis of the converted path described above, and provides the acquired information for the list checker 26.

The list to be used for check is a whitelist or a blacklist. In the whitelist, information about one or more files permitted to be accessed are registered. In the blacklist, information about one or more files denied to be accessed are registered.

The list checker 26 checks the information about the file requested to be accessed against the list (whitelist or blacklist). It is determined whether the information about the file requested to be accessed matches information on any of files registered in the list. Conceivable examples of information to be checked include position information on the file requested to be accessed (a path on a file system), the identifier of the file, metadata information such as "inode", a hash value of the file, signature information, and the behavior of a system call string issued by the process (program) having issued a request for access to the file. One of these pieces of the information may be checked, or multiple pieces of the information may be checked.

The list to be used for check may be changed in conformity with the environment of the process having requested access to the file. Accordingly, even when the same file is accessed, the access control policy (a list to be used for check) can be changed in conformity with the environment where the file is accessed.

The access controller 27 has a function of performing access control in response to a check result. For example, the whitelist scheme permits file access, such as file execution, if information identical to information about the file requested to be accessed is recorded in the list (if the check result shows that there is a match). If the check result shows that there is no match, access is denied. Alternatively, a method of outputting an alert through log output or the like and then permitting access if the check result shows that there is no match, can be adopted.

Conversely, in the case of a blacklist scheme, the access controller 27 denies file access such as file execution if the check result shows that there is a match, and this controller permits access if the result shows that there is no match. Also in this case, instead of denial of access, a method of outputting an alert and then permitting access may be adopted.

The access controller 27 may be implemented as a part of the security process, or implemented as a module or a function separated from the security process.

Figure 7:
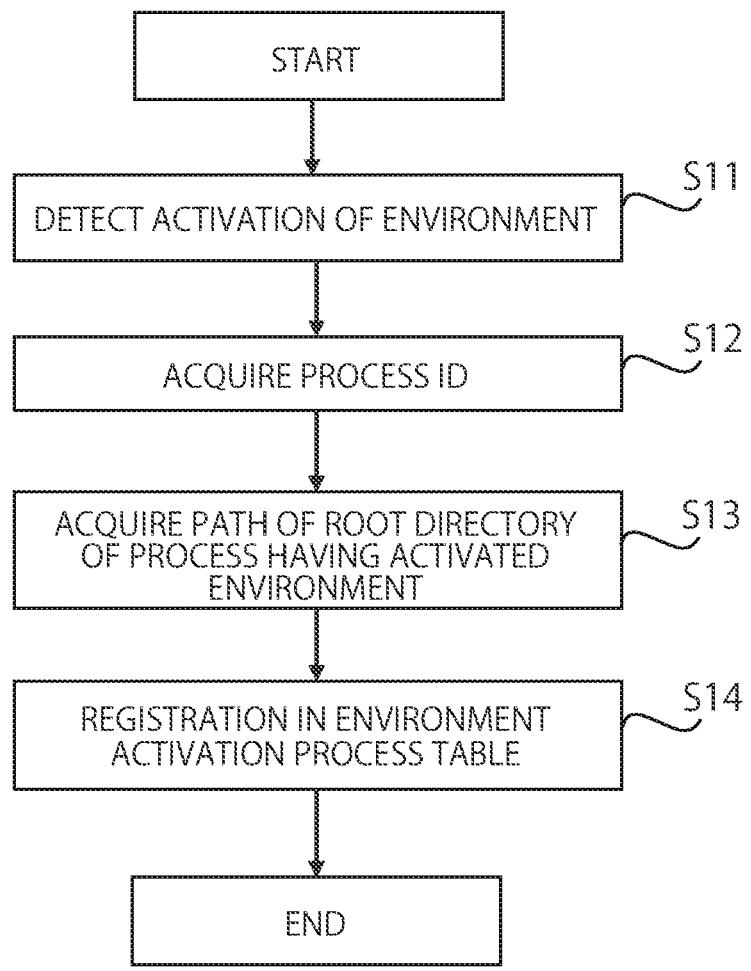
FIG. 7 is a flowchart showing an example of processing procedures at the time of environment activation according to the first embodiment.
Figure 8:
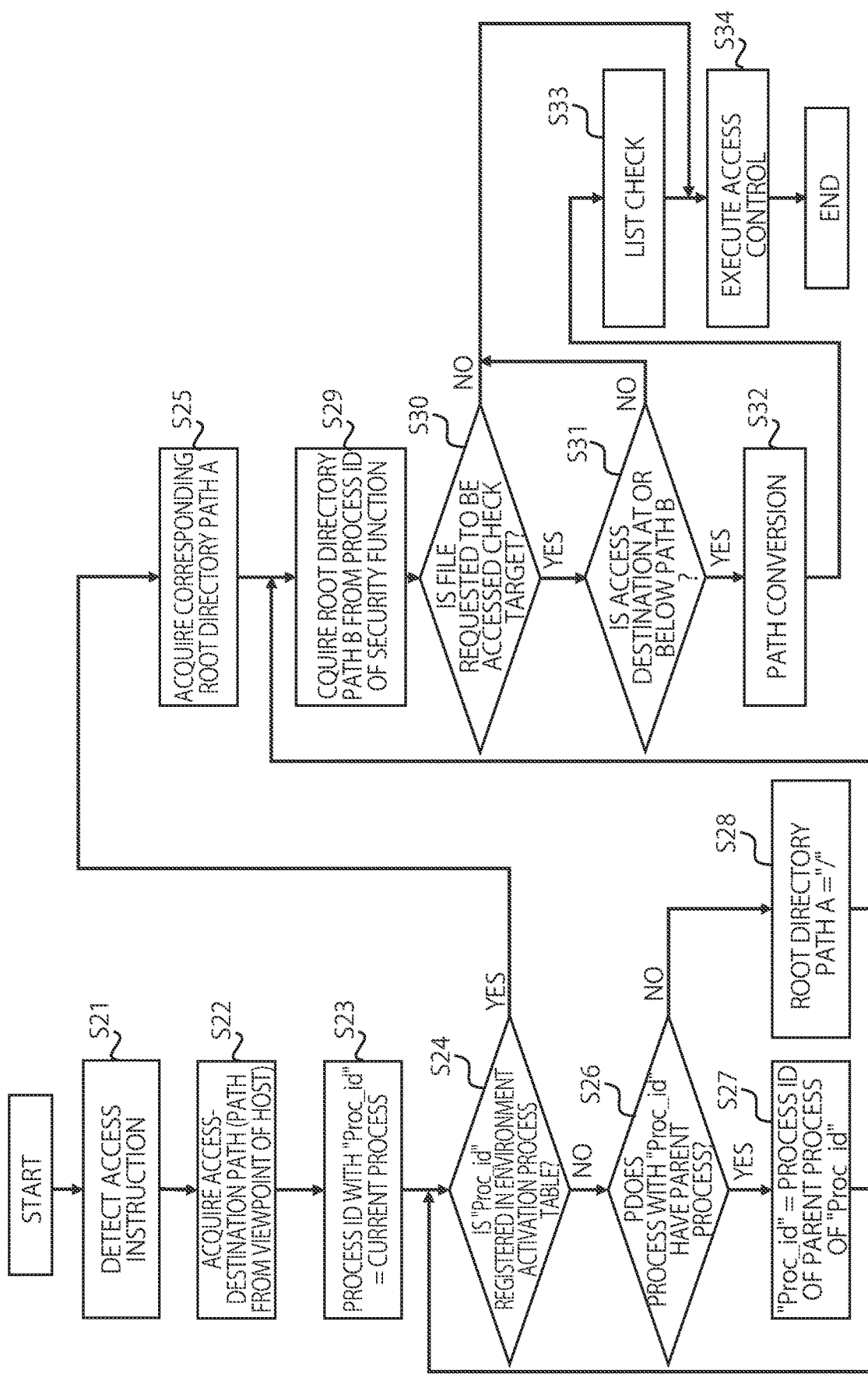
FIG. 8 is a flowchart showing an example of processing procedures of access control according to the first embodiment.

FIGS. 7 and 8 are flowcharts showing examples of operations of the access control apparatus 11. In more detail, FIG. 7 shows a processing flow at the time of environment activation. FIG. 8 shows a processing flow at the time of file access.

First, referring to FIG. 7, the processing flow at the time of environment activation is described. The environment activation detector 21 detects activation of the environment by capturing issuance of a specific instruction, system call or the like (S11). The environment activation detector 21 acquires the process ID of a process having activated the environment (S12), and further acquires the path of the root directory of the process having activated the environment (S13). The environment activation detector 21 registers the process ID and the path of the root directory in the environment activation process table (S14).

Subsequently, referring to FIG. 8, the processing flow at the time of file access is described. The access detector 23 detects an access instruction for file access, such as file execution (S21). The access detector 23 acquires the path of the file requested to be accessed, and the process ID of the process having requested access (the process having issued the access instruction) (S22). This file path is not a path representing the position of the file viewed from the inside of the environment to which the process having requested file access belongs, but is a path before change of the root directory (the path representing the position of the file viewed from the host system).

The check necessity determiner 24 performs the following processes using the process relationship determiner 22 in order to acquire the path of the root directory of the process having requested access (current process). First, the process ID of the current process is replaced with "Proc_id" (S23).

Next, it is checked whether "Proc_id" is registered in the environment activation process table (see FIG. 4) (S24). If "Proc_id" is registered, the processing proceeds to step S25, in which a root directory path (assumed as a root directory path A) corresponding to "Proc_id" is acquired (S25).

If "Proc_id" is not registered, the process table (see FIG. 5) is searched for an entry having the current process ID matching "Proc_id" (S26), and the parent process ID of the retrieved entry is acquired. If the parent process is present (in cases where the parent process ID is other than "NULL" in the example in FIG. 5), the process ID of the parent process is replaced with "Proc_id" (S27), and the processing returns to step S24.

If there is no parent process (in a case where the parent process ID is "NULL" in the example in FIG. 5), the root directory path (assumed as the root directory path A) is assumed as "/" (S28).

Furthermore, the root directory path of the environment in which the process of the security function (security process) is operated is acquired. Specifically, according to a method similar to that of the flow in steps S24 to S29, the root directory path (assumed as a root directory path B) of the environment in which the security process is operated is acquired (S29). For example, in the examples in FIGS. 4 and 5, the root directory path of the process having the "PROCESS ID"="1234" is "/home/data1/".

Subsequently, it is determined whether to check the file requested to be accessed or not, on the basis of the root directory path A, the root directory path B, the process ID of the process having requested access, the process ID of the process having activated the environment of the security process and the like (S30). As this method, any of the methods described in the items (1) to (4) described above may be used.

In a case where the file requested to be accessed is to be checked, it is determined whether the file requested to be accessed is present on a layer at or below the root directory path B of the security process or not (step S31). Accordingly, it can be determined whether the security process can access the file requested to be accessed or not.

When the file requested to be accessed is present on a layer at or below the root directory path B of the security process, the path converter 25 converts the path of the file requested to be accessed into the path of the environment in which the security process is operated (S32). The list checker 26 performs check that checks whether a path identical to the converted path is registered in the list (S33). As for the information about the file requested to be accessed, it is herein determined whether the path (position information on the file) is registered in the list. However, the information to be checked is not limited to the path. The access controller 27 executes file access control by the process having requested access on the basis of the check result (S34).

The access control based on the check result has thus been described above. That is, the access control varies according to whether the control adopts a blacklist scheme or a whitelist scheme. In the case of a request for executing a file that is not registered in the whitelist or is registered in the blacklist, besides denial of file execution a method may be adopted that outputs a log and permits file execution itself.

If it is determined that the file requested to be accessed is inaccessible from the security process in step S31, the access controller 27 performs access control by any method (S34). For example, a default policy of access control may be preliminarily configured (for example, setting of always allowing execution, or setting of always denying execution can be configured), and a function of allowing operation according to the default policy during access control may be provided. Note that a configuration that performs check if it is determined that the file requested to be accessed is inaccessible from the security process, may also be adopted.

According to the first embodiment, it can be determined whether to perform check or not on the basis of, such as, the environment (root directory path) in which the process having requested file access is operated, and the environment (root directory path) in which the security process is operated. For example, in a case where the environment in which the process having requested file access is operated is a sandbox, it can be determined whether or not to perform check according to whether or not the security process (security function) belongs to the same environment as that of the sandbox. That is, it can be determined whether to perform check or not according to whether software (security function) for taking security measures, such as whitelist type execution control, is operated out of the sandbox or operated in the sandbox. Alternatively, it can be determined whether or not to perform check according to whether the file requested to be accessed is in the environment of the security process or out of the environment. According to the first embodiment, path conversion (identifier conversion) for file access is performed. Accordingly, the file can be accessed from the security process, and information about the file used for check can be acquired.

Variation Example of First Embodiment

In the first embodiment, every time a file access request is issued the parent process of the process having requested access is traced, and the process ID and the root directory path of the process having activated the environment of this process is acquired. This process has high overhead. Accordingly, this variation example reduces the overhead.

Figure 9:
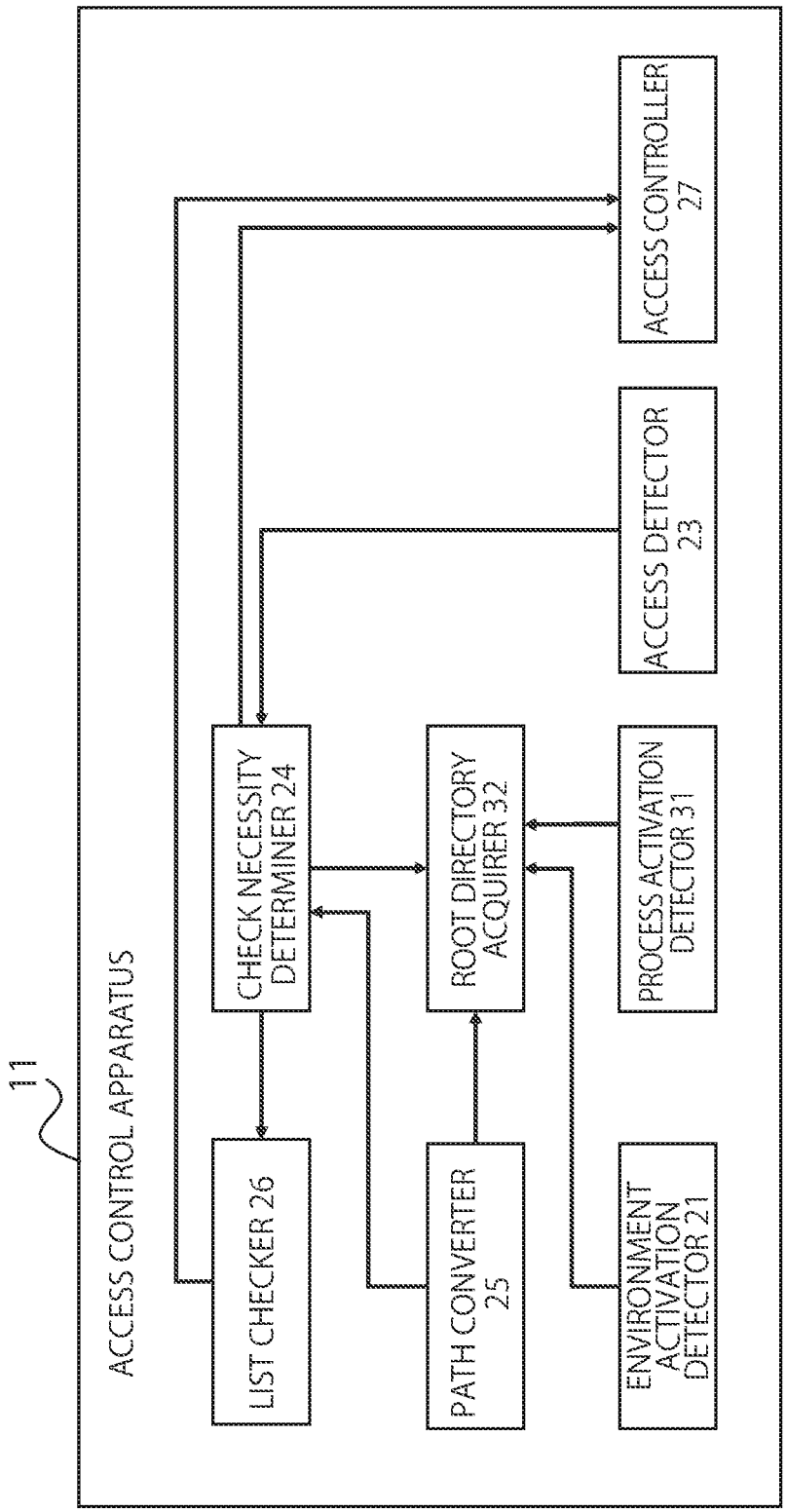
FIG. 9 shows a variation example of an access control apparatus according to the first embodiment.

FIG. 9 is a block diagram of an access control apparatus 11 according to the variation example of the first embodiment. In FIG. 9, a process activation detector 31 is additionally provided for FIG. 3. Instead of the process relationship determiner 22, a root directory acquirer 32 (data range acquirer) is provided. The operation of the environment activation detector 21 is different from that in the first embodiment.

FIG. 10 shows a process table (process-related data) according to this variation example. An environment activation process ID field is added to each entry of the process table. The environment activation process ID is the ID of a process having activated the environment. When a process is generated, the environment activation process ID is added to the entry of this process. Instead of the environment activation process ID, the path of the root directory of the environment activated by the environment activation process may be registered.

Upon detection of activation of a process, the process activation detector 31 acquires the environment activation process ID of the parent process, and sets the environment activation process ID in the entry of the process. For example, when a process having a "PROCESS ID"="1234" is activated, the entry of the parent process of this process, i.e., the entry having "PROCESS ID"="1230" as "CURRENT PROCESS ID", is referred to. "ENVIRONMENT ACTIVATION PROCESS ID"="1220" is acquired from the entry of the parent process having been referred to, and "ENVIRONMENT ACTIVATION PROCESS ID"="1220" is set in the entry of this process.

When the environment activation detector 21 captures an environment activation instruction, the detector sets the ID of the process having issued the environment activation instruction, as the environment activation process ID, in the entry of this process. For example, in the example in FIG. 10, when the process with "PROCESS ID"="1220" activates the environment, "1220" is set in the environment activation process ID field of the entry with "PROCESS ID"="1220".

Figure 11:
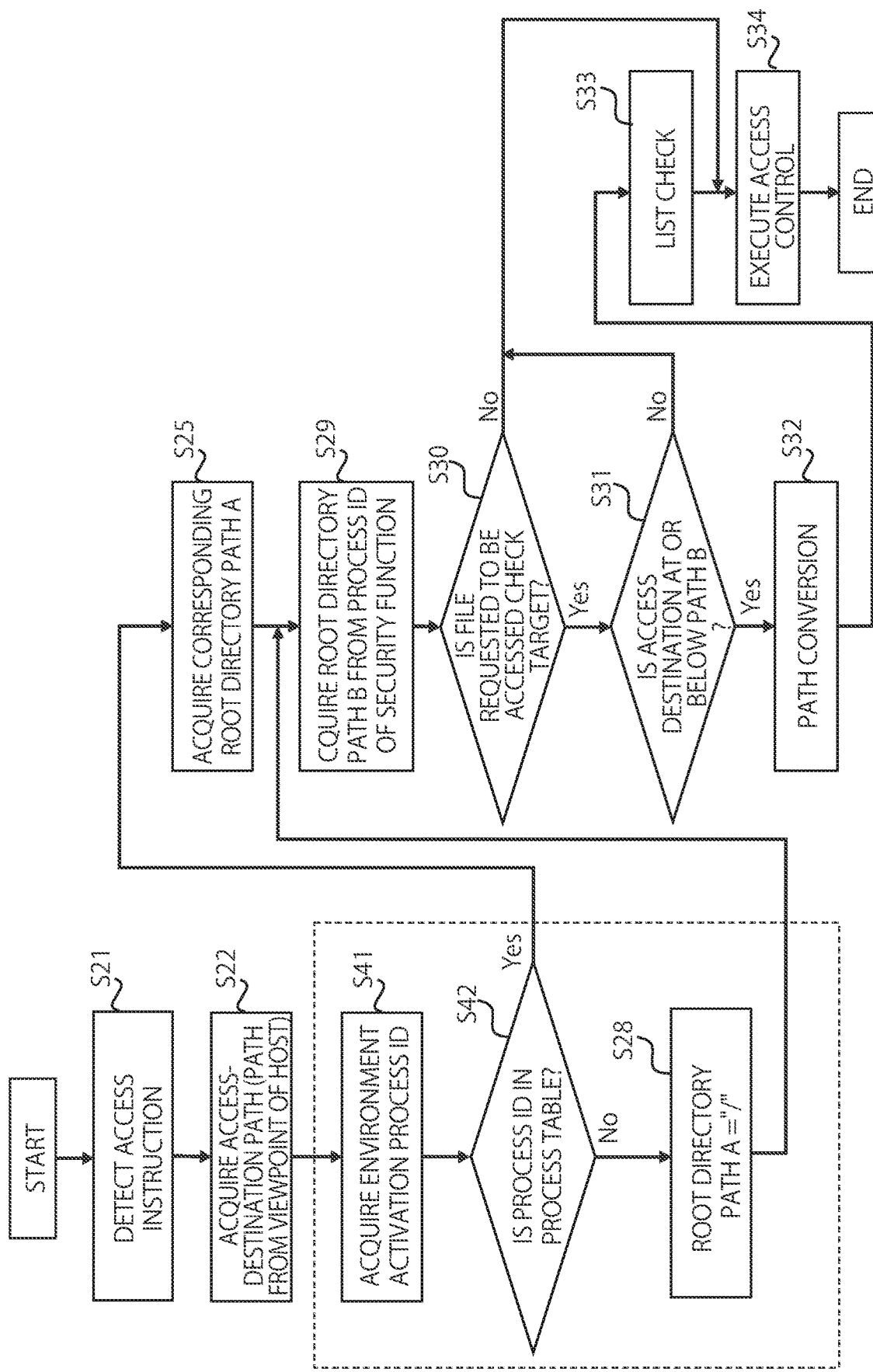
FIG. 11 is a flowchart showing an example of processing procedures of access control according to a variation example of the first embodiment.

FIG. 11 is a processing flow during access control according to this variation example. FIG. 11 is different from FIG. 8 in processing procedures encircled by broken lines. The processing procedures encircled by the broken lines are herein described. The root directory acquirer 32 acquires the process ID of the process having activated the environment (environment activation process) (S41), and determines whether the process ID is present in the process table. When the process ID is present, the processing proceeds to step S25, and a root directory path (root directory path A) is acquired from the environment activation process table (S25). If the process ID is not present, the root directory path (root directory path A) is assumed as "/", and the processing proceeds to step S29.

Figure 12:
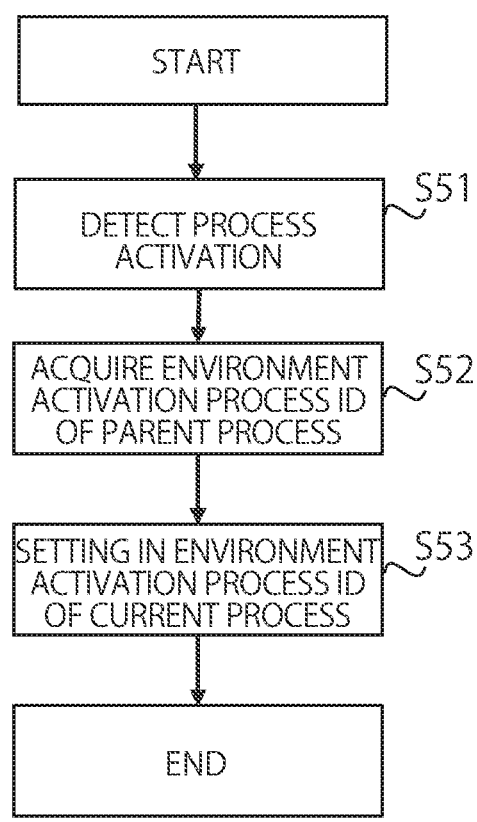
FIG. 12 is a flowchart showing an example of processing procedures at the time of process activation according to a variation example of the first embodiment.

FIG. 12 is a processing flow at the time of process activation according to this variation example. When the process activation detector 31 detects activation of a process (S51), this detector acquires the environment activation process ID from the entry of the parent process in the process table (S52). Furthermore, the environment activation process ID is set in the environment activation process ID field of the entry having the process ID of the activated process (S53).

Figure 13:
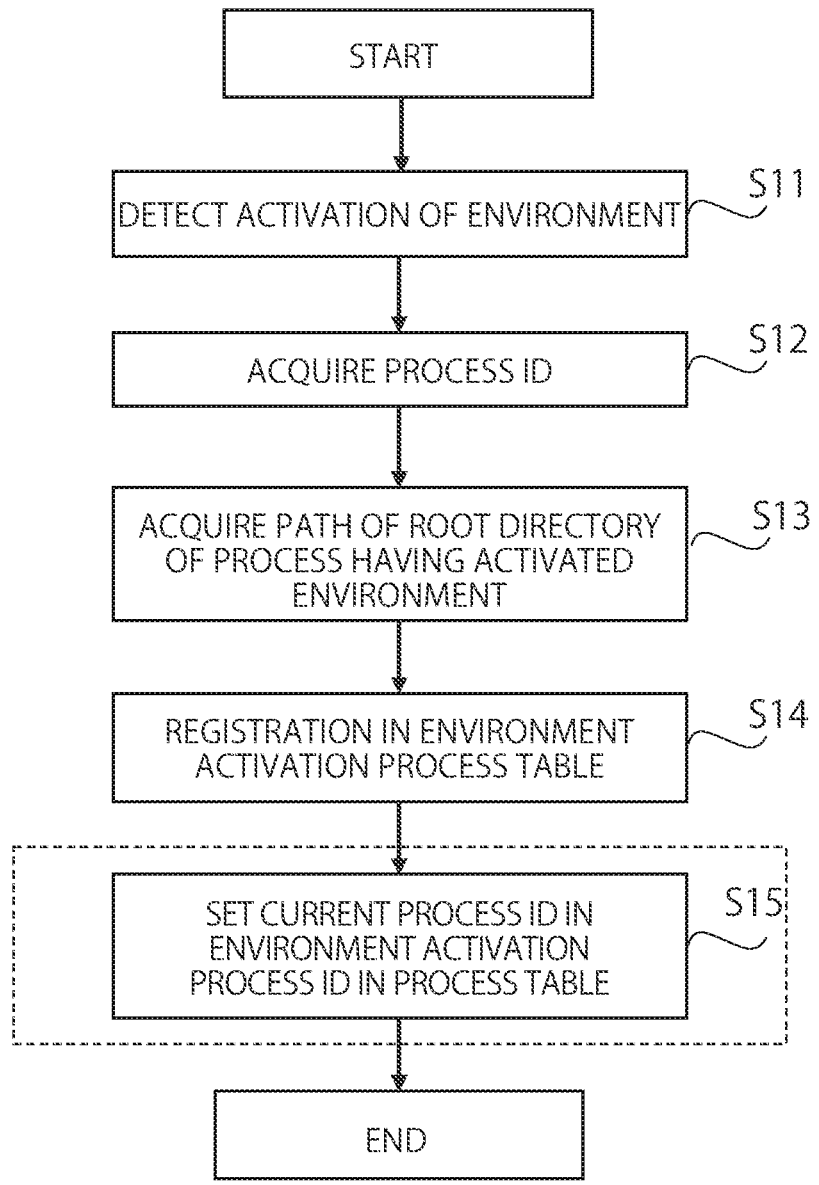
FIG. 13 is a flowchart showing an example of processing procedures at the time of environment activation according to a variation example of the first embodiment.

FIG. 13 is a processing flow at the time of environment activation. FIG. 13 is different from FIG. 7 in processing procedures encircled by broken lines. The processing procedures encircled by the broken lines are herein described. In the encircled part, the process ID acquired in step S12 is set, as the environment activation process ID, in the entry of the process having activated the environment in the process table.

This variation example can simplify the processes during access control in comparison with the first embodiment.

Second Embodiment

This embodiment deals with a case where from an activated environment, another environment is further activated. Accordingly, the case of multiple activation of environments can be supported.

Figure 14:
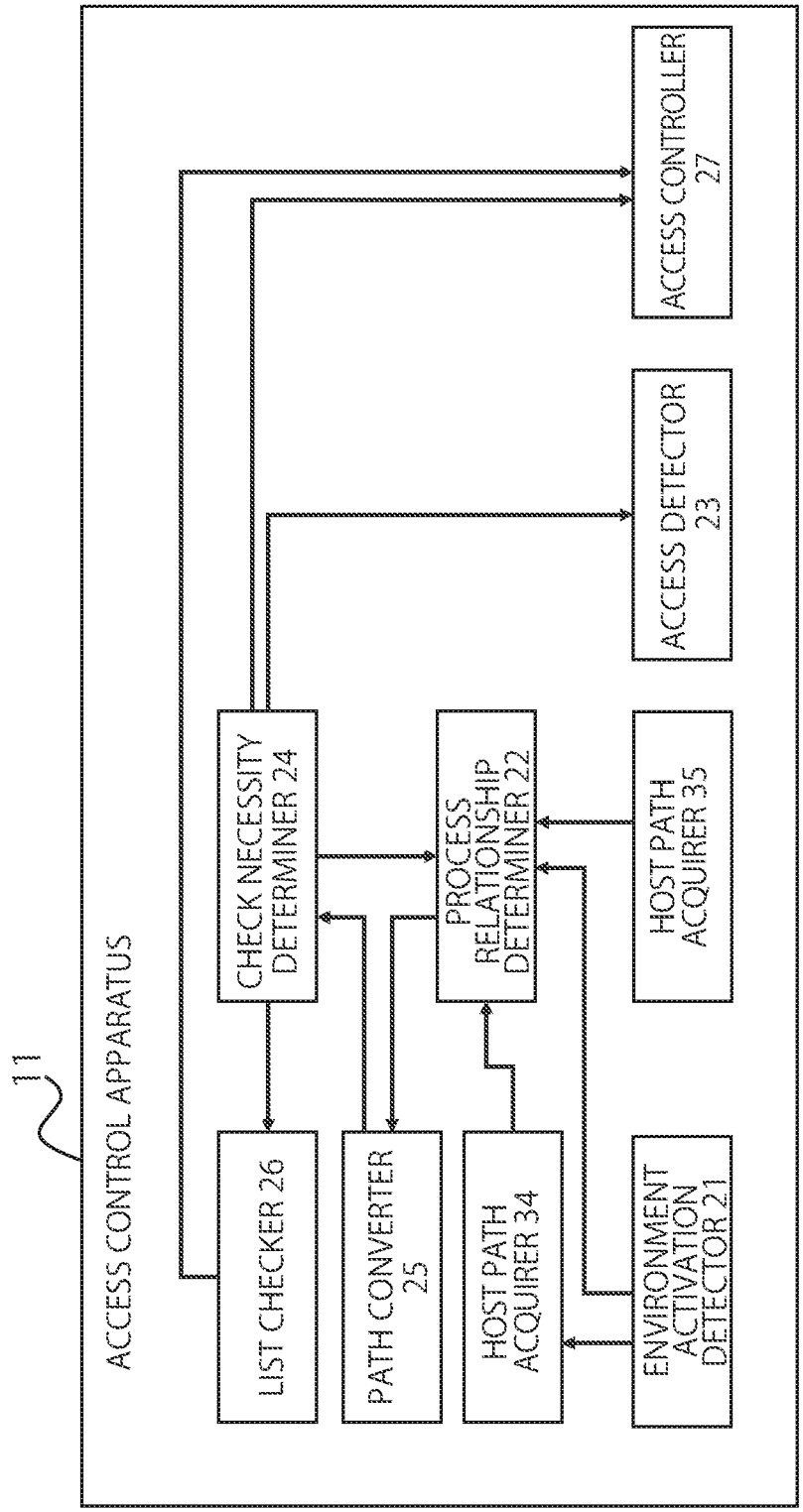
FIG. 14 shows an example of an access control apparatus according to a second embodiment.

FIG. 14 is a block diagram showing the internal configuration of an access control apparatus 11 according to a second embodiment. FIG. 14 has a configuration different from that in FIG. 3, in that a host path acquirer 34 (data range information acquirer) and a process end detector 35 are provided, and in the internal operation of the environment activation detector 21. The operations of the other blocks are the same as those in the first embodiment. Accordingly, the description thereof is omitted.

Upon detection of activation of a new environment by capturing an environment activation instruction, the environment activation detector 21 provides the host path acquirer 34 with information, such as the process ID of the process having activated the new environment, and arguments of the environment activation instruction.

The host path acquirer 34 acquires, from the process relationship determiner 22, the root directory path of the process having activated the new environment (the root directory path of the original environment before activation of the new environment). The host path acquirer 34 acquires root directory information (the relative root directory path viewed from the original environment before activation of the new environment) on the environment newly activated based on the arguments and the like of the environment activation instruction. The host path acquirer 34 generates the root directory path of the environment for the newly activated process in a form of a path viewed from the root directory of the host system 1, on the basis of the acquired information.

That is, the root directory information on the newly activated environment is information in the data range (assumed as a first data range) referable from a first environment, and defines this first data range from the viewpoint of the original environment (second environment). The host path acquirer 34 acquires the data range information that defines this first data range, from the viewpoint of the host system provided with the second environment, on the basis of the information in this first data range, and information in a data range (assumed as a third data range) referable from the second environment (original environment).

The operation of the host path acquirer 34 is hereinafter described with reference to FIGS. 15 and 16.

Figures 15, 16:
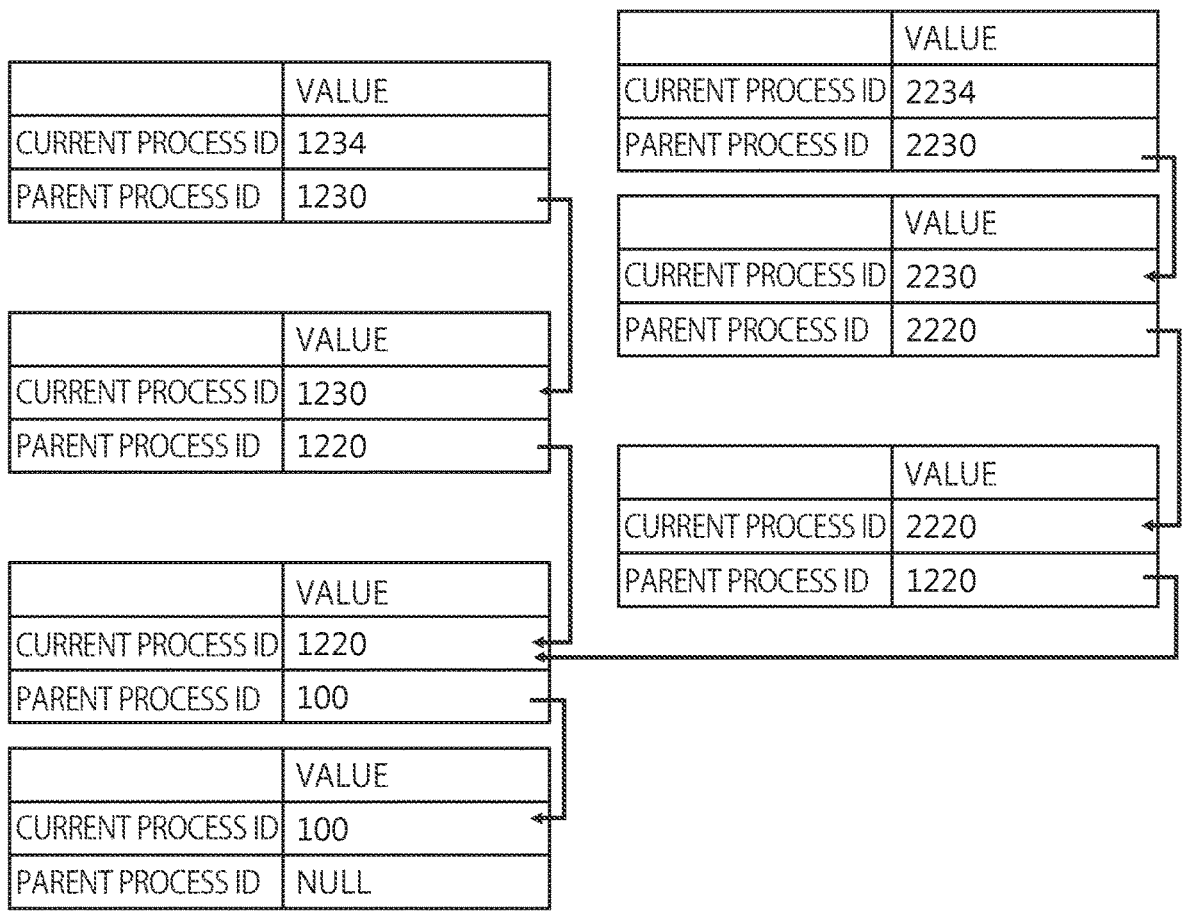
FIG. 15 shows an example of a process table according to the second embodiment.
FIG. 16 shows an example of an environment activation process table according to the second embodiment.

FIG. 15 shows an example of a process table according to the second embodiment. FIG. 16 shows an example of an environment activation process table according to the second embodiment.

In the example in FIG. 15, the process with "PROCESS ID"="100" activates the process with "PROCESS ID"="1220". Furthermore, the process with "PROCESS ID"="1220" activates the processes with "PROCESS ID(s)"="1230" and "2220". Furthermore, the process with "PROCESS ID"="2220" activates the process with "PROCESS ID"="2230".

At this time, the process with "PROCESS ID"="100" is assumed to be operated in a state before environment activation (on the host system). It is further assumed that the process with "PROCESS ID"="1220" designates "/home/data1/" as the root directory, and activates a new environment (second environment). It is further assumed that the process with "PROCESS ID"="2230" designates "/foo/" as the root directory, and activates a new environment (first environment). That is, the second environment is first activated, and then the first environment is activated in the second environment.

In this case, as shown in FIG. 16, first, for the process with "PROCESS ID"="1220", "/home/data1/" is recorded as the root directory path of the environment (second environment) activated by this process. That is, first, it is recorded that the process with "PROCESS ID"="1220" designates "/home/data1/" as the root directory path, and activates the environment (second environment). Furthermore, when the process with "PROCESS ID"="2230" activates the new environment (first environment), for the process with "PROCESS ID"="2230", "/home/data1/foo/" is recorded as the root directory path of the environment (first environment) activated by this process. That is, the process with "PROCESS ID"="2230" is operated in the environment (second environment) originally activated by the process with "PROCESS ID"="1220". Accordingly, the root directory of the original environment (second environment) is "/home/data1/". The root directory information designated when "PROCESS ID"="2230" activates the environment (first environment) is "/foo/". Accordingly, the path of /foo/ viewed from the host system is "/home/data1/foo/". That is, the root directory path viewed from the host system can be acquired by combining the original root directory path (/home/data1/) of the process having activated the environment with the root directory information (/foo/) provided when the environment is activated.

The process end detector 35 detects end of the process, and checks whether another process (including the process having activated the environment) operated in the environment of this process remains. If no other process remains, the root directory path for the process having activated the environment is removed from the environment activation process table.

Specifically, upon detection of end of a certain process, the process end detector 35 checks the process ID of the process having activated the environment to which this process belongs. Furthermore, this detector checks for any child process activated by the process having activated this environment is present. If any child process is present, the detector further checks whether or not any child process thereof remains. By repeating this, the detector checks whether any process operated in this environment remains.

Figure 17:
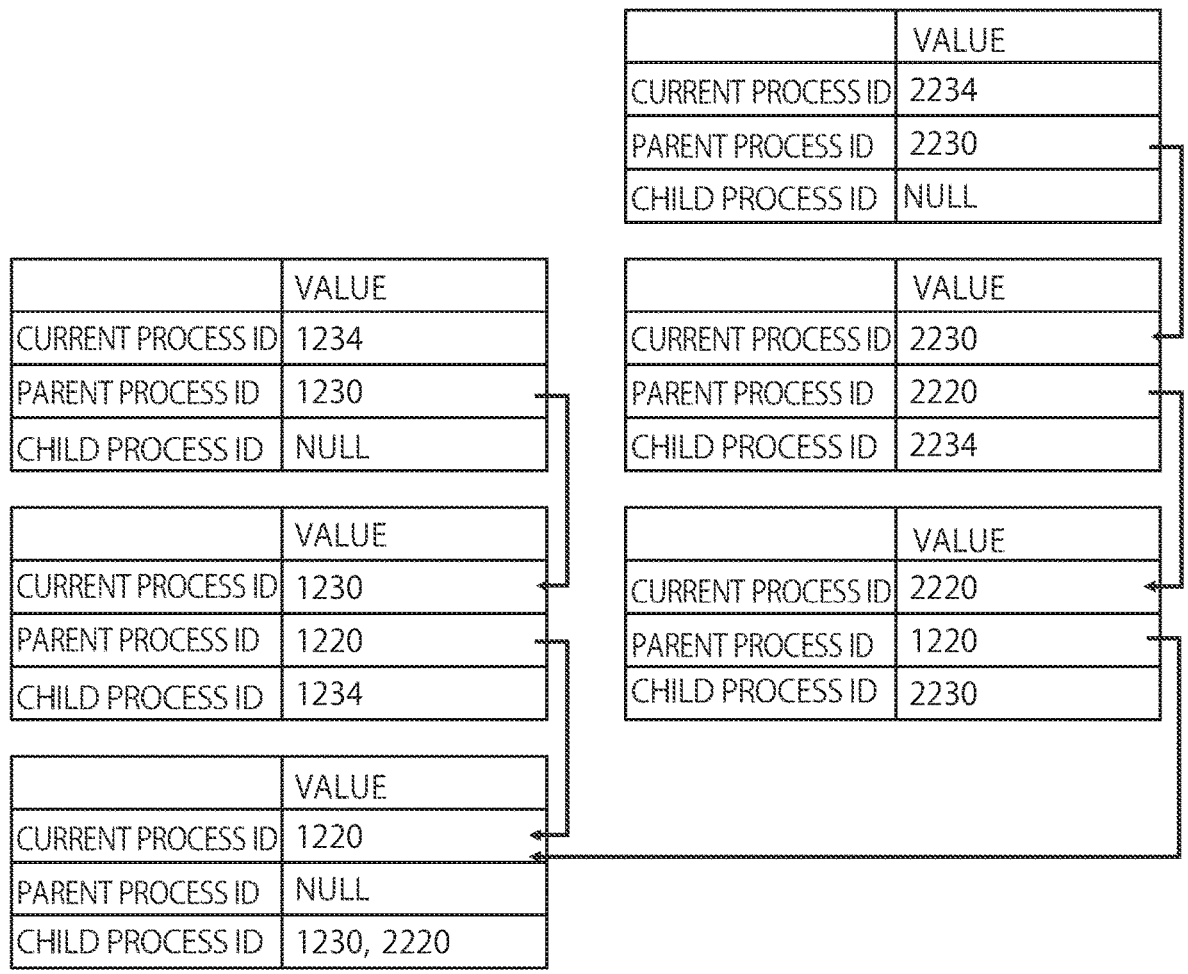
FIG. 17 shows another example of a process table according to the second embodiment.

If no process remains, the entry including the process ID of the process having activated the environment is removed from the environment activation process table. Referring to FIG. 17, a specific example is described.

FIG. 17 shows another example of the process table according to the second embodiment. In the example in FIG. 17, information on a child process ID is included in the entry. Accordingly, efficient tracing from the parent process to the child process can be achieved. For example, when the process with "PROCESS ID"="1234" is ended, the process having activated the environment to which the process with "PROCESS ID"="1234" belongs is identified. The process having activated the environment is a process with "PROCESS ID"="1220". Accordingly, the child of the process with "PROCESS ID"="1220" is traced, which can efficiently determine whether any process remains or not. If no process remains, the entry of "PROCESS ID"="1220" is removed from the environment activation process table. If at least one process remains, the entry of "PROCESS ID"="1220" is not removed from the environment activation process table.

Figure 18:
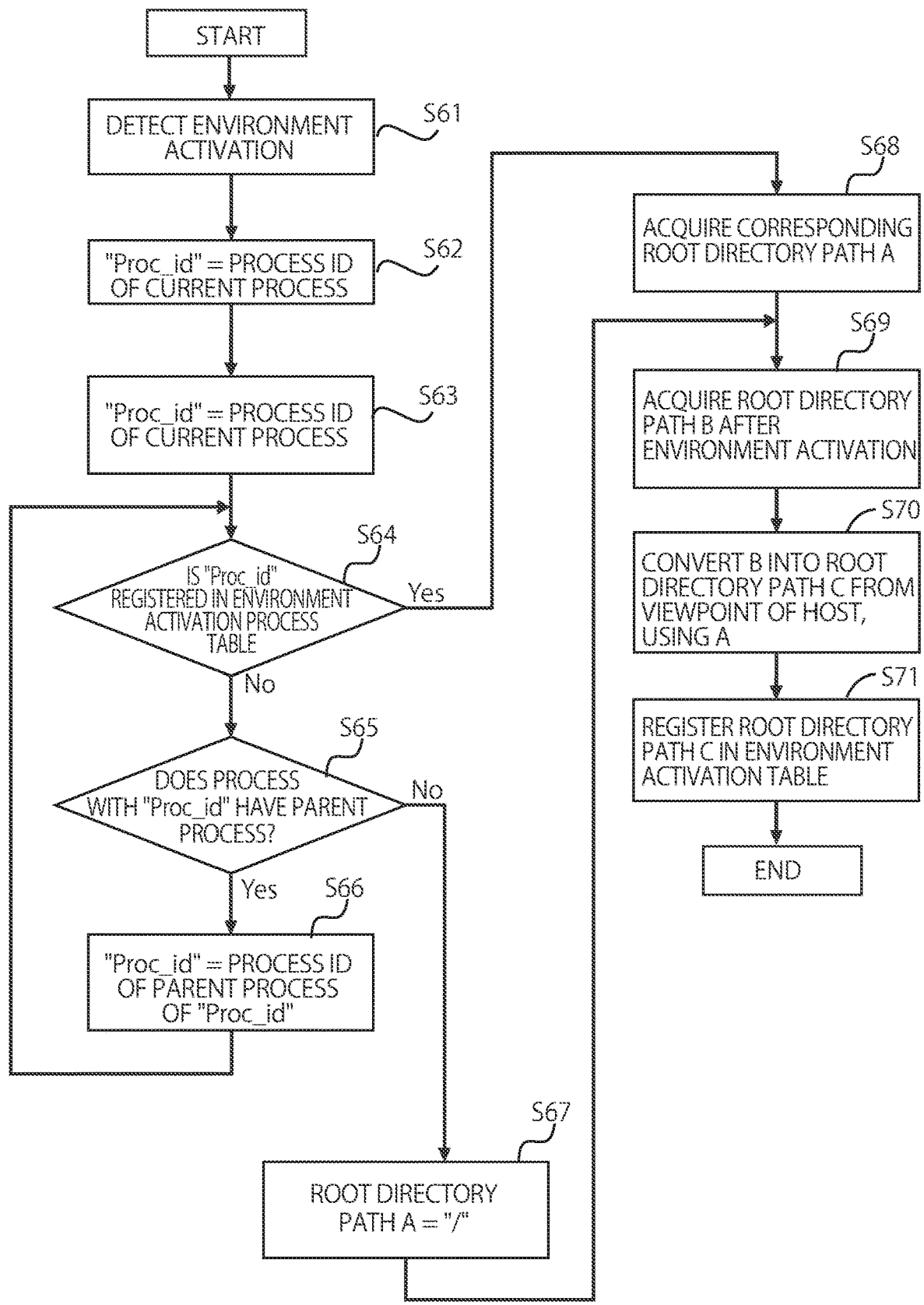
FIG. 18 is a flowchart showing an example of processing procedures at the time of environment activation according to the second embodiment.
Figure 19:
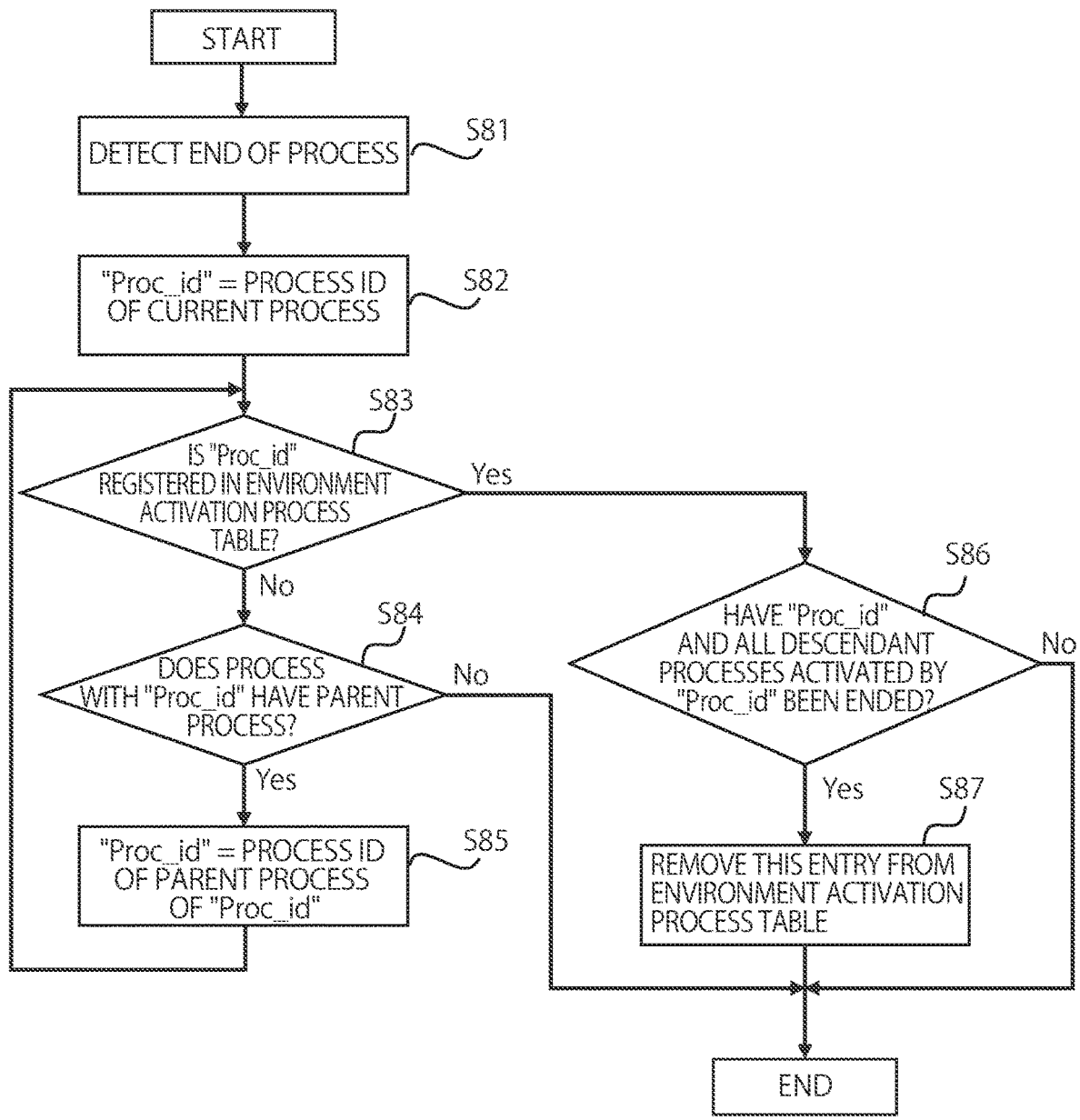
FIG. 19 is a flowchart showing an example of processing procedures at the time of process end according to the second embodiment.

FIGS. 18 and 19 are examples of processing flows in this embodiment. The access control flow is similar to that in FIG. 8. Accordingly, illustration and description are omitted.

FIG. 18 is a processing flow at the time of environment activation. The environment activation detector 21 detects activation of an environment by, such as, capturing a specific system call (S61), and acquires the process ID of the process (current process) having issued an instruction of activating the environment. To acquire the root directory path of the current process, the host path acquirer 34 performs the following processes.

First, the process ID of the current process is replaced with "Proc_id" (S63). It is checked whether the process with "Proc_id" is registered in the environment activation process table (S64). If the process with "Proc_id" is not registered, it is checked whether the process with "Proc_id" has a parent process using the process relationship determiner 22 (S65). If the parent process is present, the process ID of the parent process is replaced with "Proc_id" (S66), and the processing returns to step S64. If the process with "Proc_id" is registered in the environment activation process table in step S64, the root directory (assumed as the root directory path A) corresponding to the process with "Proc_id" is acquired from the environment activation process table (S68). Subsequently, the processing proceeds to step S69. If the process with "Proc_id" does not have a parent process in step S65, it is determined that the process with "Proc_id" is operated on the host system 1. The root directory path is assumed as "/" (assumed as the root directory path A) (S67). Subsequently, the processing proceeds to step S69.

In step S69, the host path acquirer 34 acquires root directory information (the relative root directory path viewed from the original environment before activation of the new environment; assumed as the root directory path B) from the arguments and the like of the environment activation instruction (S70). The root directory path B is a relative path viewed from the root directory path A. Based on the root directory path A, the root directory path B is converted into a root directory path (root directory path C) viewed from the host system 1. Furthermore, the root directory path C and the process ID of the process having activated the environment are associated with each other, and registered as an entry in the environment activation table (S71).

FIG. 19 is a processing flow at the time of process end. When the process end detector 35 detects end of the process (S81), the process ID of the ended process (current process) is replaced with "Proc_id" (S82). Furthermore, it is checked whether "Proc_id" is registered in the environment activation process table (S83). If "Proc_id" is not registered, it is checked whether the process with "Proc_id" has a parent process using the process relationship determiner 22 (S84). The process relationship determiner 22 refers to the process table, and checks whether the process with "Proc_id" has a parent process. If the parent process is present, the process end detector 35 replaces the process ID of the parent process with "Proc_id" (S85), and the processing returns to step S83. If the parent process is not present, it is determined that the process with "Proc_id" is operated directly on the host system 1, and the processing is finished. If "Proc_id" is registered in the environment activation process table in step S83, processes are sequentially traced from the process with "Proc_id". That is, the processes are sequentially traced such as the child process activated by the process with "Proc_id", the process (grandchild process) activated by the child process, and the process activated by the grandchild process (the same applies to the following). Accordingly, it is checked whether all the descendant processes of the process with "Proc_id" (the process having activated the environment) have been ended (S86). If there is at least one process having not been ended, the processing is finished. Conversely, if all the processes are ended, the entry about the process with "Proc_id" is removed from the environment activation process table (S87).

According to this embodiment, also in the case of multiple activation of environments, flexible access control can be achieved. This can also support the case of ending the environment having once been activated. That is, typically, in many environments, the process ID is reused after the process is ended. Accordingly, if the information about the process ID of the ended process remains in the environment activation process table, the environment of the process and the root directory cannot be correctly discriminated from each other. On the other hand, according to this embodiment, at the time of end of the process, if the processes on all the layers at or below the root directory of this process are ended, the root directory path of the process having activated this environment is removed from the environment activation process table. Accordingly, also when the process ID is reused, the environment activation process table can be correctly maintained, and the environment of the process and the root directory can be correctly discriminated from each other.

The root directory information (root directory path) may be registered directly in the process table. In that case, the ID of the process having activated the environment is also registered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
processing circuitry configured to:
detect an access request for target data;
determine necessity of checking information indicating whether access to the target data is permitted, based on position information on the target data, and on a data range to be checked,
wherein if the position information is included in the data range to be checked, the processing circuitry is configured to determine to perform the check.

2. The information processing apparatus according to claim 1,
wherein the processing circuitry is configured to detect activation of a first environment, and acquire information indicating a data range referable from the first environment, and
wherein the data range to be checked is a first data range referable from the first environment.

3. The information processing apparatus according to claim 2,
wherein the first environment is activated by a first process,
the access request for the target data is generated by a second process, and
if the second process has a descendant relationship with the first process, the processing circuitry is configured to determine to perform the check.

4. The information processing apparatus according to claim 1,
wherein the data range to be checked is a second data range referable from a third process relating to a security function.

5. The information processing apparatus according to claim 4,
wherein the access request for the target data is generated by a second process, and
if the second process has a descendant relationship with the third process, the processing circuitry is configured to determine to perform the check.

6. The information processing apparatus according to claim 4,
wherein the access request for the target data is generated by a second process, and
if the third process is in an environment identical to that of the second process, the processing circuitry is configured to determine to perform the check.

7. The information processing apparatus according to claim 4,
wherein the processing circuitry is configured to detect activation of a first environment, and acquire information on a first data range referable from the first environment,
wherein the first environment is activated by a first process, and
the processing circuitry is configured to convert the position information on the target data into a format referable from the third process, based on the information indicating the first data range, if the third process has a descendant relationship with the first process.

8. The information processing apparatus according to claim 7,
wherein the check is a process of determining whether the converted position information on the target data has a match in a list that includes position information on the data permitted or denied to be accessed.

9. The information processing apparatus according to claim 7,
wherein the position information on the target data is represented by a first path in a hierarchical structure,
the second data range is represented by a second path in the hierarchical structure, and
the processing circuitry is configured to convert the position information on the target data by removing, from the first path, a path part continuously matching between the first path and the second path from a top layer.

10. The information processing apparatus according to claim 2,
wherein the access request for the target data is generated by a second process,
the processing circuitry is configured to detect activation of a process in an environment, and generate process-related data that associates the detected process with a fourth process that is a process having activated the environment,
the information processing apparatus comprises a first storage configured to store environment data which associates the fourth process with a data range referable from the environment activated by the fourth process, and
the processing circuitry is configured to identify the fourth process associated with the second process in the process-related data, and adopt, as the first data range, the data range corresponding to the fourth process in the environment data.

11. The information processing apparatus according to claim 2,
wherein the access request for the target data is generated by a second process, and
the processing circuitry is configured to:
detect activation of a process in an environment, and generate process-related data that associates the detected process with a data range referable from the environment; and
adopt, as the first data range, a data range associated with the second process in the process-related data.

12. The information processing apparatus according to claim 2,
wherein the processing circuitry is configured to detect activation of the first environment in a second environment and acquires information of the first data range, and the information of the first data range indicates the first data range from a viewpoint of the second environment, and
acquire data range information that indicates the first data range, from a viewpoint of a system provided with the second environment, based on the information of the first data range, and information of a third data range referable from the second environment.

13. The information processing apparatus according to claim 2, further comprising
a second storage configured to store information of the first data range; and
wherein the processing circuitry is configured to examine whether all of a first process having activated the first environment and processes having a descendant relationship with the first process are ended, and remove the information of the first data range from the storage if all of the first process and the processes having a descendant relationship with the first process are ended.

14. The information processing apparatus according to claim 1, further comprising
a checker circuit configured to perform the check, when the processing circuitry determines to perform the check.

15. The information processing apparatus according to claim 14,
wherein the checker circuit is configured to determine whether first information associated with the target data is included in a list of information associated with the data permitted or denied to be accessed.

16. An information processing method performed in a computer, comprising:
detecting, by the computer, an access request for target data, from a process executed on an operation system by a Central Processing Unit (CPU); and
determining, by the computer, necessity of checking information indicating whether access to the target data is permitted, based on position information on the target data, and on a data range to be checked, when the access request is detected,
wherein if the position information is included in the data range to be checked, the processing circuitry is configured to determine to perform the check.

17. A non-transitory computer readable medium having a computer program stored therein which causes a computer to perform processes when executed by the computer, the processes, comprising:
detecting an access request for target data from a process executed on an operating system by a Central Processing Unit (CPU); and
determining necessity of checking information indicating whether access to the target data is permitted, based on position information on the target data, and on a data range to be checked, when the access request is detected,
wherein if the position information is included in the data range to be checked, the processing circuitry is configured to determine to perform the check.

* * * * *